US 9,335,919 B2

(12) United States Patent
Wong

(10) Patent No.: US 9,335,919 B2
(45) Date of Patent: May 10, 2016

(54) VIRTUAL SHADE

(75) Inventor: Adrian Wong, Mountain View, CA (US)

(73) Assignee: Google Inc., Mountain View, CA (US)

(*) Notice: Subject to any disclaimer, the term of this patent is extended or adjusted under 35 U.S.C. 154(b) by 641 days.

(21) Appl. No.: 13/532,127

(22) Filed: Jun. 25, 2012

(65) Prior Publication Data
US 2015/0177864 A1    Jun. 25, 2015

(51) Int. Cl.
G02B 27/01    (2006.01)
G06F 1/16    (2006.01)
G06F 3/01    (2006.01)
G06F 3/0488    (2013.01)

(52) U.S. Cl.
CPC ............ G06F 3/0488 (2013.01); G02B 27/017 (2013.01); G06F 1/163 (2013.01); G02B 2027/0178 (2013.01); G06F 3/013 (2013.01)

(58) Field of Classification Search
CPC ............ G02B 27/0101; G02B 27/017; G02B 2027/0178; G06F 3/0488; G06F 1/163; G06F 3/013
USPC .................................................. 345/7, 8, 173
See application file for complete search history.

(56) References Cited

U.S. PATENT DOCUMENTS

| 5,067,795 A | 11/1991 | Senatore | |
|---|---|---|---|
| 7,874,666 B2 | 1/2011 | Xu et al. | |
| 7,876,288 B1 | 1/2011 | Huang | |
| 8,016,415 B2 * | 9/2011 | Figler et al. | |
| 2006/0238550 A1 * | 10/2006 | Page | 345/661 |
| 2012/0060089 A1 * | 3/2012 | Heo et al. | 715/702 |
| 2012/0068913 A1 * | 3/2012 | Bar-Zeev et al. | 345/8 |
| 2012/0092300 A1 * | 4/2012 | Wang et al. | 345/175 |
| 2013/0335573 A1 * | 12/2013 | Forutanpour et al. | 348/158 |

* cited by examiner

Primary Examiner — Aneeta Yodichkas
(74) Attorney, Agent, or Firm — McDonnell Boehnen Hulbert & Berghoff LLP

(57) ABSTRACT

Methods and systems disclosed herein relate to a shading function or device for use with a head-mountable device. An example method could include determining, from a touch-sensitive surface of the head-mountable device, a swipe interaction. The head-mountable device could include at least one optical element. The at least one optical element could be configured to transmit outside light from an environment of the head-mountable device. The method could further include causing at least one property of the at least one portion of the at least one optical element to be controlled based on the swipe interaction. The at least one property could include a transmittance of the at least one optical element. In one implementation, the optical element could be mounted a substantially distal surface of a see-through display.

27 Claims, 10 Drawing Sheets

VIRTUAL SHADE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called a head-mountable device or a "head-mounted display". A head-mountable device places a graphic display or displays close to one or both eyes of a wearer. To generate the images on a display, a computer processing system may be used. Such displays may occupy a wearer's entire field of view, or only occupy part of wearer's field of view. Further, head-mountable devices may be as small as a pair of glasses or as large as a helmet.

SUMMARY

In a first aspect, a method is provided. The method includes determining, from a touch-sensitive surface of a head-mountable device, a gesture. The head-mountable device includes at least one optical element. The at least one optical element is configured to transmit outside light from an environment of the head-mountable device. The method also includes causing at least one property of at least a portion of the at least one optical element to be controlled based on the gesture. The at least one property includes a transmittance of the at least one optical element.

In a second aspect, a head-mountable device is provided. The head-mountable device includes a touch-sensitive surface, at least one optical element, and a controller. The touch-sensitive surface is configured to receive a gesture input. The at least one optical element is configured to transmit outside light from an environment of the head-mountable device. The controller is configured to adjust at least one property of at least a portion of the at least one optical element based on the gesture input. The at least one property comprises a transmittance of the at least one optical element.

In a third aspect, a non-transitory computer readable medium having stored instructions is provided. The instructions are executable by a computing device to cause the computing device to perform functions. The functions include causing a head-mountable device to receive, from a touch-sensitive surface of the head-mountable device, a gesture input. The head-mountable device includes at least one optical element. The at least one optical element is configured to transmit outside light from an environment of the head-mountable device. The functions further include causing at least one property of at least a portion of the at least one optical element to be controlled based on the gesture input. The at least one property includes a transmittance of the at least one optical element.

In a fourth aspect, a method is provided. The method includes acquiring sensor data from a sensor of a head-mountable device, and determining, based on the sensor data, a gesture input. The head-mountable device includes at least one optical element, which is configured to transmit outside light from an environment of the head-mountable device. The method further includes causing at least one property of at least a portion of the at least one optical element to be controlled based on the gesture input. The at least one property includes a transmittance of the at least one optical element.

These as well as other aspects, advantages, and alternatives, will become apparent to those of ordinary skill in the art by reading the following detailed description, with reference where appropriate to the accompanying drawings.

DETAILED DESCRIPTION

Figure 1A:
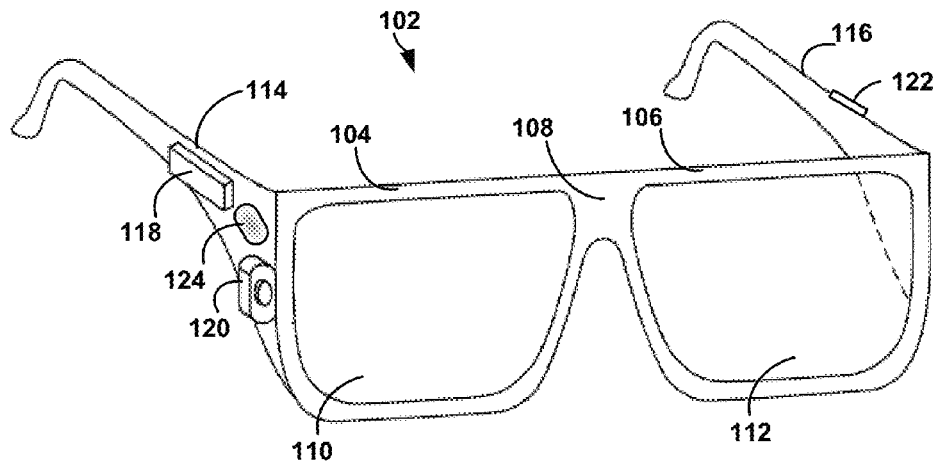
FIG. 1A illustrates a head-mountable device according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments disclosed herein relate to an apparatus and method for receiving or determining, from a touch-sensitive surface of a head-mountable device, a gesture or swipe interaction. The head-mountable device includes at least one optical element, which is configured to transmit light from an environment of the head-mountable device. The disclosed apparatus and method further relate to causing at least one property of at least a portion of the at least one optical element to be controlled based on the gesture or swipe interaction. The at least one property includes a transmittance of the at least one optical element.

Some methods disclosed herein could be carried out in part or in full by a device. The device could be a head-mountable device or a head-mounted display. However, the device could represent another type of wearable computing device. The device could be operable to determine a swipe interaction using a touch-sensitive surface. The touch-sensitive surface could be a capacitive touch surface or a touch pad. Other types of touch-sensitive surfaces are possible.

Additionally or alternatively, the device could be operable to determine a swipe gesture based on acquired sensor data from a sensor of the head-mountable device. The sensor of the head-mountable device could include a camera, a photodiode, or another type of sensor. Such swipe gestures could include physical gestures (e.g., sign language, arm/hand movements) and/or eye-fixation gestures (e.g., gaze axis movement). Other types of swipe gestures are possible.

The device could also include at least one optical element, which could be configured to transmit outside light from an environment of the head-mountable device. The at least one optical element could take many different forms. For instance, the at least one optical element could represent one or more of an electrochromic film or a liquid crystal cell. The optical element could be incorporated into a lens, an eyepiece, a face mask, a visor, a helmet, a see-through material, or a display screen, among other examples. Other types of optical elements are possible.

The optical element could include a controllable property. In an example embodiment, the controllable property could include a transmittance of the at least one optical element. For instance, controlling the optical element could include adjusting the transmittance of the optical element so that the optical element appears highly transparent or highly opaque. In some embodiments, the opacity of the optical element could be adjusted continuously based on, for instance, a user input.

Further, various portions of the optical element could be controlled to have a different transmittance compared to other portions of the optical element. For instance, a user of the head-mountable device could use a finger to touch the touch-sensitive surface. In response, the transmittance of the optical element could be controlled. In one example embodiment, the user could perform a swipe interaction, 'swiping' a finger from a top edge of the touch-sensitive surface to the middle of the touch-sensitive surface. In response, the transmissivity of the optical element could be lowered in approximately the top half of the optical element. Thus, the top half of the optical element could appear darker than the rest of the optical element. If the device included the optical element as a see-through element, the top half of the see-through element could be darkened. The optical element could also be controlled based on swipe gestures, such as physical gestures and eye-fixation (or eye-tracking) gestures described above.

Other methods disclosed herein could be carried out in part or in full by a server (e.g., a computer system and/or a computer network located separately from the head-mountable device). In an example embodiment, the server could receive touch sensor data from the head-mountable device. Based on the touch sensor data, the server could determine that a user of the head-mountable device has provided a swipe interaction.

The server could generate a control instruction for the optical element based on the gesture or swipe interaction. For instance, if the touch sensor data indicated that the user swiped from the left side to the center of the touch-sensitive surface, the server may generate a control instruction indicating that the transmittance should be decreased for approximately the left half of the optical element.

The server could transmit the control instruction to the head-mountable device. Further, the head-mountable device could perform an action based on the control instruction. For example, the head-mountable device could control reduce transmittance for at least a portion of the optical element. Other interactions between a device and a server are possible within the context of the disclosure.

A system is also described in the present disclosure. The system could include a head-mountable device that could include several elements. In an example embodiment, the head-mountable device includes a touch-sensitive surface, at least one optical element, and a controller.

The touch-sensitive surface could be configured to sense a gesture or swipe interaction. The at least one optical element could be configured to transmit outside light from an environment of the head-mountable device. The controller could be configured to adjust at least one property of at least a portion of the at least one optical element based on the swipe interaction. The at least one property includes a transmittance of the at least one optical element.

It will be understood that the system could include more or fewer elements than those disclosed herein. Further the elements of the system could be configured and/or be operable to perform more or fewer functions within the context of the present disclosure.

In some embodiments, each of the elements of the system could be incorporated into the head-mounted device. In other embodiments, some or all of the elements of the system may be located apart from other elements of the system. Thus, the system could operate in a distributed manner.

Also disclosed herein are non-transitory computer readable media with stored instructions. The instructions could be executable by a computing device to cause the computing device to perform functions similar to those described in the aforementioned methods.

Those skilled in the art will understand that there are many different specific methods and systems that could be applied in receiving a swipe interaction using a touch-sensitive surface of a head-mountable device and causing a transmittance property of at least a portion of at least one optical element of the head-mountable device to be controlled based on the swipe interaction. Each of these specific methods and systems are contemplated herein, and several example embodiments are described below.

2. Example Systems

Systems and devices in which example embodiments may be implemented will now be described in greater detail. In general, an example system may be implemented in or may take the form of a wearable computer. However, an example system may also be implemented in or take the form of other devices, such as a mobile phone, a tablet computer, a visor, a helmet, or a pair of glasses, among other examples. Further, an example system may take the form of non-transitory computer readable medium, which has program instructions stored thereon that are executable by at a processor to provide the functionality described herein. An example system may also take the form of a device (e.g., a wearable computer or mobile phone), or a subsystem of such a device, which includes such a non-transitory computer readable medium having such program instructions stored thereon.

FIG. 1A illustrates a head-mountable device (HMD) 102 (which may also be referred to as a head-mounted display). In some implementations, HMD 102 could function as a wearable computing device. It should be understood, however, that example systems and devices may take the form of or be implemented within or in association with other types of devices, without departing from the scope of the invention. Further, unless specifically noted, it will be understood that the systems, devices, and methods disclosed herein are not functionally limited by whether or not the head-mountable device 102 is being worn. As illustrated in FIG. 1A, the head-mountable device 102 comprises frame elements including lens-frames 104, 106 and a center frame support 108, lens elements 110, 112, and extending side-arms 114, 116. The center frame support 108 and the extending side-arms 114, 116 are configured to secure the head-mountable device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mountable device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mountable device 102 to the user. The extending side-arms 114, 116 may further secure the head-mountable device 102 to the user by extending around a rear portion of the user's head. Additionally or alternatively, for example, the HMD 102 may connect to or be affixed within a head-mountable helmet structure. Other possibilities exist as well.

The HMD 102 may also include an on-board computing system 118, a video camera 120, a sensor 122, and a finger-operable touch pad 124. The on-board computing system 118 is shown to be positioned on the extending side-arm 114 of the head-mountable device 102; however, the on-board computing system 118 may be provided on other parts of the head-mountable device 102 or may be positioned remote from the head-mountable device 102 (e.g., the on-board computing system 118 could be wire- or wirelessly-connected to the head-mountable device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mountable device 102; however, the video camera 120 may be provided on other parts of the head-mountable device 102. The video camera 120 may be configured to capture images at various resolutions or at different frame rates. Many video cameras with a small form-factor, such as those used in cell phones or webcams, for example, may be incorporated into an example of the HMD 102.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mountable device 102; however, the sensor 122 may be positioned on other parts of the head-mountable device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mountable device 102. However, the finger-operable touch pad 124 may be positioned on other parts of the head-mountable device 102. Also, more than one finger-operable touch pad may be present on the head-mountable device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
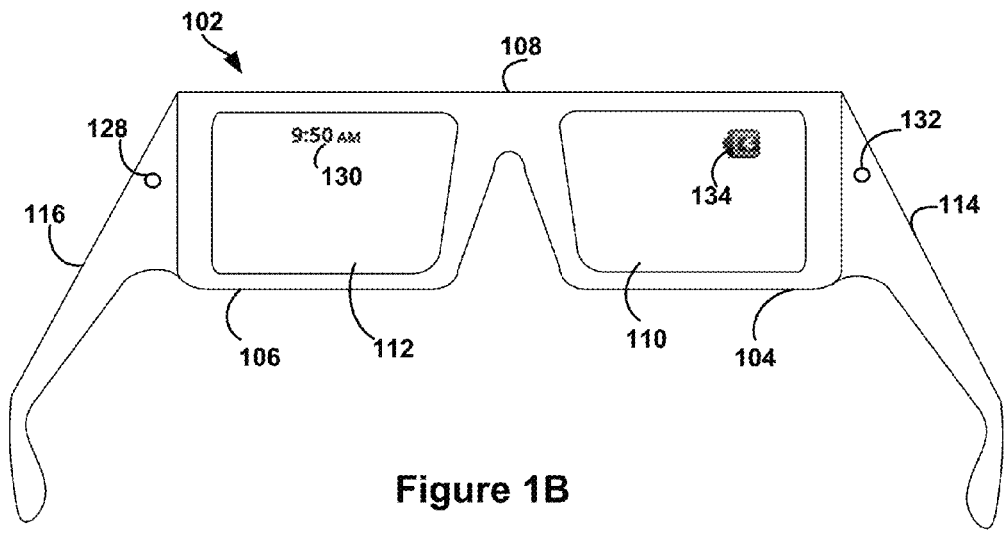
FIG. 1B illustrates an alternate view of the head-mountable device illustrated in FIG. 1A.

FIG. 1B illustrates an alternate view of the head-mountable device illustrated in FIG. 1A. As shown in FIG. 1B, the lens elements 110, 112 may act as display elements. The head-mountable device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
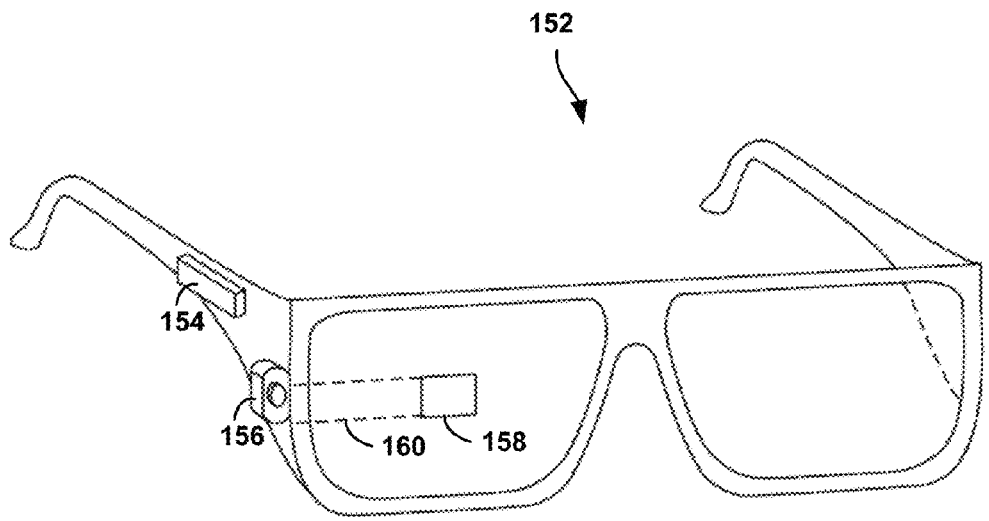
FIG. 1C illustrates another head-mountable device according to an example embodiment.

FIG. 1C illustrates another head-mountable device according to an example embodiment, which takes the form of an HMD 152. The HMD 152 may include frame elements and side-arms such as those described with respect to FIGS. 1A and 1B. The HMD 152 may additionally include an on-board computing system 154 and a video camera 156, such as those described with respect to FIGS. 1A and 1B. The video camera 156 is shown mounted on a frame of the HMD 152. However, the video camera 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
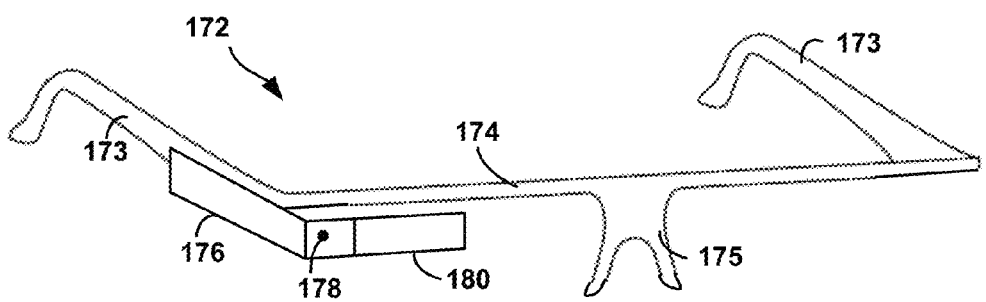
FIG. 1D illustrates another head-mountable device according to an example embodiment.

FIG. 1D illustrates another head-mountable device according to an example embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include an on-board computing system 176 and a video camera 178, such as those described with respect to FIGS. 1A and 1B.

The HMD 172 may include a single lens element 180 that may be coupled to one of the side-arms 173 or the center frame support 174. The lens element 180 may include a display such as the display described with reference to FIGS. 1A and 1B, and may be configured to overlay computer-generated graphics upon the user's view of the physical world. In one example, the single lens element 180 may be coupled to the inner side (i.e., the side exposed to a portion of a user's head when worn by the user) of the extending side-arm 173. The single lens element 180 may be positioned in front of or proximate to a user's eye when the HMD 172 is worn by a user. For example, the single lens element 180 may be positioned below the center frame support 174, as shown in FIG. 1D.

Figure 2:
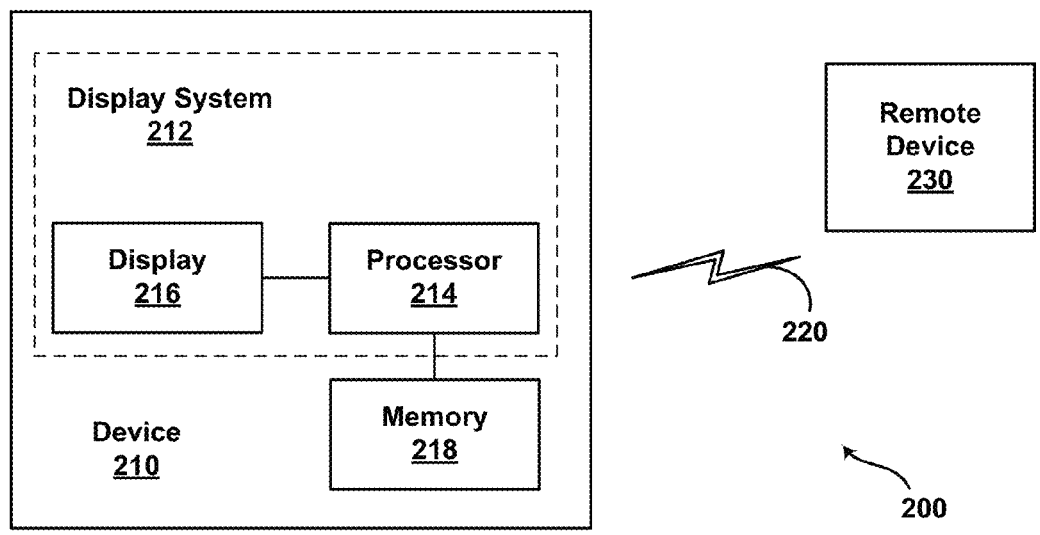
FIG. 2 illustrates a schematic drawing of a computing device according to an example embodiment.

FIG. 2 illustrates a schematic drawing of a computing device according to an example embodiment. In system 200, a device 210 communicates using a communication link 220 (e.g., a wired or wireless connection) to a remote device 230. The device 210 may be any type of device that can receive data and display information corresponding to or associated with the data. For example, the device 210 may be a head-mountable display system, such as the head-mountable devices 102, 152, or 172 described with reference to FIGS. 1A-1D.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 3:
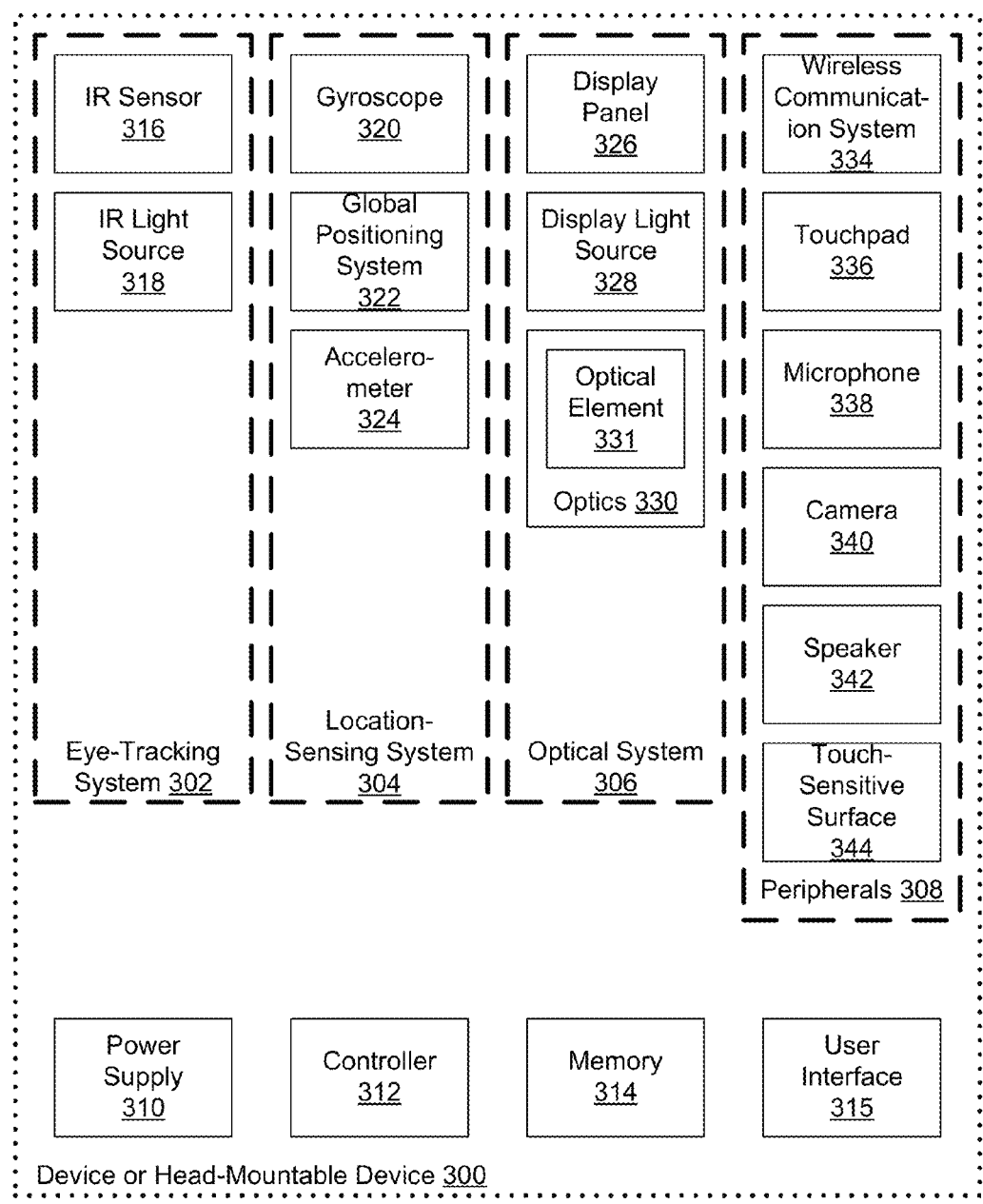
FIG. 3 illustrates a simplified block drawing of a device or head-mountable device according to an example embodiment.

FIG. 3 is a simplified block diagram of a device or head-mountable device (HMD) 300 that may include several different components and subsystems. HMD 300 could correspond to any of the devices shown and described in reference to FIGS. 1A-1D and FIG. 2. As shown, the HMD 300 includes an eye-tracking system 302, a location-sensing system 304, an optical system 306, peripherals 308, a power supply 310, a controller 312, a memory 314, and a user interface 315. The eye-tracking system 302 may include hardware such as an infrared sensor 316 and at least one infrared light source 318. The location-sensing system 304 may include a gyroscope 320, a global positioning system (GPS) 322, and an accelerometer 324. The optical system 306 may include, in an example embodiment, a display panel 326, a display light source 328, and optics 330. The optics 330 could include at least one optical element 331. The peripherals 308 may include a wireless communication system 334, a touchpad 336, a microphone 338, a camera 340, a speaker 342, and a touch-sensitive surface 344.

In an example embodiment, HMD 300 includes a see-through display. Thus, the wearer of HMD 300 may observe a portion of the real-world environment, i.e., in a particular field of view provided by the optical system 306. In the example embodiment, HMD 300 is operable to display images that are superimposed on the field of view, for example, to provide an "augmented reality" experience. Some of the images displayed by HMD 300 may be superimposed over particular objects in the field of view. HMD 300 may also display images that appear to hover within the field of view instead of being associated with particular objects in the field of view.

In other words, the head-mountable device is configured to provide a view, from a viewing location, of a graphical representation and a real-world environment of the device.

HMD 300 could be configured as, for example, eyeglasses, goggles, a helmet, a hat, a visor, a headband, or in some other form that can be supported on or from the wearer's head. Further, HMD 300 may be configured to display images to both of the wearer's eyes, for example, using two see-through displays. Alternatively, HMD 300 may include only a single see-through display and may display images to only one of the wearer's eyes, either the left eye or the right eye.

The HMD 300 may also represent an opaque display configured to display images to one or both of the wearer's eyes without a view of the real-world environment. For instance, an opaque display or displays could provide images to both of the wearer's eyes such that the wearer could experience a virtual reality version of the real world. Alternatively, the HMD wearer may experience an abstract virtual reality environment that could be substantially or completely detached from the real world. Further, the HMD 300 could provide an opaque display for a first eye of the wearer as well as provide a view of the real-world environment for a second eye of the wearer.

A power supply 310 may provide power to various HMD components and could represent, for example, a rechargeable lithium-ion battery. Various other power supply materials and types are possible.

The functioning of the HMD 300 may be controlled by a controller 312 (which could include a processor) that executes instructions stored in a non-transitory computer readable medium, such as the memory 314. Thus, the controller 312 in combination with instructions stored in the memory 314 may function to control some or all of the functions of HMD 300. As such, the controller 312 may control the user interface 315 to adjust the images displayed by HMD 300. The controller 312 may also control the wireless communication system 334 and various other components of the HMD 300. The controller 312 may additionally represent a plurality of computing devices that may serve to control individual components or subsystems of the HMD 300 in a distributed fashion.

In addition to instructions that may be executed by the controller 312, the memory 314 may store data that may include a set of calibrated wearer eye pupil positions and a collection of past eye pupil positions. Thus, the memory 314 may function as a database of information related to gaze axis and/or HMD wearer eye location. Such information may be used by HMD 300 to anticipate where the wearer will look and determine what images are to be displayed to the wearer. Within the context of the invention, eye pupil positions could also be recorded relating to a 'normal' or a 'calibrated' viewing position. Eye box or other image area adjustment could occur if the eye pupil is detected to be at a location other than these viewing positions.

In addition, information may be stored in the memory 314 regarding possible control instructions that may be enacted using eye movements. For instance, two consecutive wearer eye blinks may represent a control instruction to the user interface. Another possible embodiment may include a configuration such that specific eye movements may represent a control instruction. For example, an HMD wearer may provide a control instruction with a series of predetermined eye movements.

Control instructions could be based on dwell-based selection of a target object. For instance, if a wearer fixates visually upon a particular image or real-world object for longer than a predetermined time period, a control instruction may be generated to select the image or real-world object as a target object. Many other control instructions are possible.

The HMD 300 may include a user interface 315 for providing information to the wearer or receiving input from the wearer. The user interface 315 could be associated with, for example, the displayed images and/or one or more input devices in peripherals 308, such as touchpad 336 or microphone 338. The controller 312 may control the functioning of the HMD 300 based on inputs received through the user interface 315. For example, the controller 312 may utilize user input from the user interface 315 to control how the HMD 300 displays images within a field of view or to determine what images the HMD 300 displays.

An eye-tracking system 302 may be included in the HMD 300. In an example embodiment, an eye-tracking system 302 may deliver eye-tracking data to the controller 312 regarding the eye position of a wearer of the HMD 300. The eye-tracking data could be used, for instance, to determine a direction in which the HMD user may be gazing. The direction of gaze could be alternatively called a gaze axis. Eye-tracking data related to the direction of gaze may be termed gaze data. Based on information from the eye-tracking system 302 such as the gaze axis, the controller 312 could determine target objects among the displayed images or real-world environment. The controller 312 may control the user interface 315 and the display panel 326 to adjust the target object and/or other displayed images in various ways. For instance, an HMD wearer could interact with a mobile-type menu-driven user interface using eye gaze movements.

The infrared (IR) sensor 316 may be utilized by the eye-tracking system 302, for example, to capture images of a viewing location associated with the HMD 300. Thus, the IR sensor 316 may image the eye of an HMD wearer that may be located at the viewing location. The images could be either video images or still images. The images obtained by the IR sensor 316 regarding the HMD wearer's eye may help determine where the wearer is looking within the HMD field of view, for instance by allowing the controller 312 to ascertain the location of the HMD wearer's eye pupil. Analysis of the images obtained by the IR sensor 316 could be performed by the controller 312 in conjunction with the memory 314 to determine, for example, a gaze axis.

The imaging of the viewing location could occur continuously or at discrete times depending upon, for instance, HMD wearer interactions with the user interface 315 and/or the state of the infrared light source 318 which may serve to illuminate the viewing location. The IR sensor 316 could be integrated into the optical system 306 or mounted on the HMD 300. Alternatively, the IR sensor 316 could be positioned apart from the HMD 300 altogether. The IR sensor 316 could be configured to image primarily in the infrared. The IR sensor 316 could additionally represent a conventional visible light camera with sensing capabilities in the infrared wavelengths. Imaging in other wavelength ranges is possible.

The infrared light source 318 could represent one or more infrared light-emitting diodes (LEDs) or infrared laser diodes that may illuminate a viewing location. One or both eyes of a wearer of the HMD 300 may be illuminated by the infrared light source 318.

The eye-tracking system 302 could be configured to acquire images of glint reflections from the outer surface of the cornea, (e.g., the first Purkinje images and/or other characteristic glints). Alternatively, the eye-tracking system 302 could be configured to acquire images of reflections from the inner, posterior surface of the lens, (e.g., the fourth Purkinje images). In yet another embodiment, the eye-tracking system 302 could be configured to acquire images of the eye pupil with so-called bright and/or dark pupil images. Depending upon the embodiment, a combination of these glint and pupil imaging techniques may be used for eye tracking at a desired level of robustness. Other imaging and tracking methods are possible.

The location-sensing system 304 could be configured to provide an HMD position and an HMD orientation to the controller 312.

The gyroscope 320 could be a microelectromechanical system (MEMS) gyroscope, a fiber optic gyroscope, or another type of gyroscope. The gyroscope 320 may be configured to provide orientation information to the controller 312. The GPS unit 322 could be a receiver that obtains clock and other signals from GPS satellites and may be configured to provide real-time location information to the controller 312. The location-sensing system 304 could further include an accelerometer 324 configured to provide motion input data to the controller 312. The location-sensing system 304 could include other sensors, such as a proximity sensor and/or an inertial measurement unit (IMU).

The optical system 306 could include components configured to provide images at a viewing location. The viewing location may correspond to the location of one or both eyes of a wearer of an HMD 300. The components of the optical system 306 could include a display panel 326, a display light source 328, and optics 330. These components may be optically and/or electrically-coupled to one another and may be configured to provide viewable images at a viewing location. As mentioned above, one or two optical systems 306 could be provided in an HMD apparatus. In other words, the HMD wearer could view images in one or both eyes, as provided by one or more optical systems 306. Also, as described above, the optical system(s) 306 could include an opaque display and/or a see-through display, which may allow a view of the real-world environment while providing superimposed images.

Within the context of the present disclosure, the optics 330 could include one of, or a combination of, a lens, a visor, a helmet, a see-through element, among other examples. The optics 330 could incorporate at least one optical element 331. The optical element 331 could include at least one liquid crystal cell, an electrochromic cell, a suspended particle device, and/or a switchable mirror. The optical element 331 could be operable to change the transmittance of the optical element 331 and/or the optics 330. The optical element 331 could include a plurality of cells or operable segments that may be independently and/or successively operated with respect to neighboring cells or operable segments. In some examples, the optical element 331 could include rows and or columns of cells or operable segments. In one implementation, the optical element 331 could be mounted on a substantially distal surface of the optics 330. Other configurations are possible.

The optical element 331 could include one or more switchable elements, such as an electrochromic film, a liquid crystal cell, a suspended particle device, and/or a switchable mirror. The transmission of such optical elements may be controlled to provide various levels of opacity. For example, the optical element 331 could provide light shading (e.g., 80-100% transmission), medium shading (e.g., 50-75% transmission), and complete opacity (e.g., ~0% transmission). In some embodiments, the optical elements 331 could switch with response times around 5 milliseconds. Other types of optical elements 331 could be included in the disclosed apparatus.

Various peripheral devices 308 may be included in the HMD 300 and may serve to provide information to and from a wearer of the HMD 300.

In one example, the HMD 300 may include a wireless communication system 334 for wirelessly communicating with one or more devices directly or via a communication network. For example, wireless communication system 334 could use 3G cellular communication, such as CDMA, EVDO, GSM/GPRS, or 4G cellular communication, such as WiMAX or LTE. Alternatively, wireless communication system 334 could communicate with a wireless local area network (WLAN), for example, using WiFi. In some embodiments, wireless communication system 334 could communicate directly with a device, for example, using an infrared link, Bluetooth, or ZigBee. The wireless communication system 334 could interact with devices that may include, for example, components of the HMD 300 and/or externally-located devices.

The camera 340 could be configured to capture still images and/or video images. In some embodiments, the field of view of camera 340 could be operable to substantially capture the same field of view as may be viewable to a user of the HMD 300. In other words, the HMD 300 may provide a view of the real-world environment when viewed from a viewing position. In such scenarios, the camera 340 could be configured to capture images of a substantially similar field of view. The camera 340 could represent any device configured to capture an image, such as an image-capture device. Other configurations of camera 340 are possible.

Within the scope of the present disclosure, the touch-sensitive surface 344 could represent a capacitive or resistive surface operable to sense touch interactions, gestures, and swipe interactions. A touch interaction could include a user of the head-mountable device pressing the touch-sensitive surface 344 using a finger or to tap the surface 344. A swipe interaction could include a user of the head-mountable device dragging a finger across the touch-sensitive surface 344.

The touch-sensitive surface 344 could represent the touchpad 336. In one embodiment, the touch-sensitive surface 344 could be located along an earpiece of the head-mountable device 300. Alternatively or additionally, the touch-sensitive surface 344 could include a capacitive or resistive surface located elsewhere. For example, the touch-sensitive surface 344 could be integrated into the optical element 331 (e.g., through a touchscreen). In such an example, a user of the head-mountable device 300 could use a finger to input swipe instructions via the touch-sensitive surface 344 by touching/dragging along a surface of the optical element 331.

In an example embodiment, the touch-sensitive surface 344 could be located along a top edge of the optical element 331 of a head-mountable device 300. A user of the head-mountable device could input a swipe instruction by sliding a finger from left to right (or right to left) across the top edge of the optical element 331. Other locations and types of touch-sensitive surfaces 344 are possible with the context of the present disclosure.

Upon determining a swipe interaction using touch-sensitive surface 344, controller 312 could act to control at least one property of at least a portion of the optical element 331. In an example embodiment, a transmittance of the optical element 331 could be changed based on the swipe interaction. In such an example, a left-to-right swipe interaction could be sensed. In response, the transmittance of the optical element 331 could be reduced sequentially from the left side of the optical element 331 to the right side of optical element 331. In doing so, a portion or all of the real-world view of the environment of the head-mounted device 300 could be dimmed or shaded.

Although FIG. 3 shows various components of the HMD 300 as being integrated into HMD 300, one or more of these components could be physically separate from HMD 300. For example, the touch-sensitive surface 344 could be mounted elsewhere on a user separate from HMD 300. Thus, the HMD 300 could be part of a wearable computing device in the form of separate devices that can be worn on or carried by the wearer. The separate components that make up the wearable computing device could be communicatively coupled together in either a wired or wireless fashion.

3. Example Implementations

Several example implementations will now be described herein. It will be understood that there are many ways to implement the devices, systems, and methods disclosed herein. Accordingly, the following examples are not intended to limit the scope of the present disclosure.

Figure 4A:
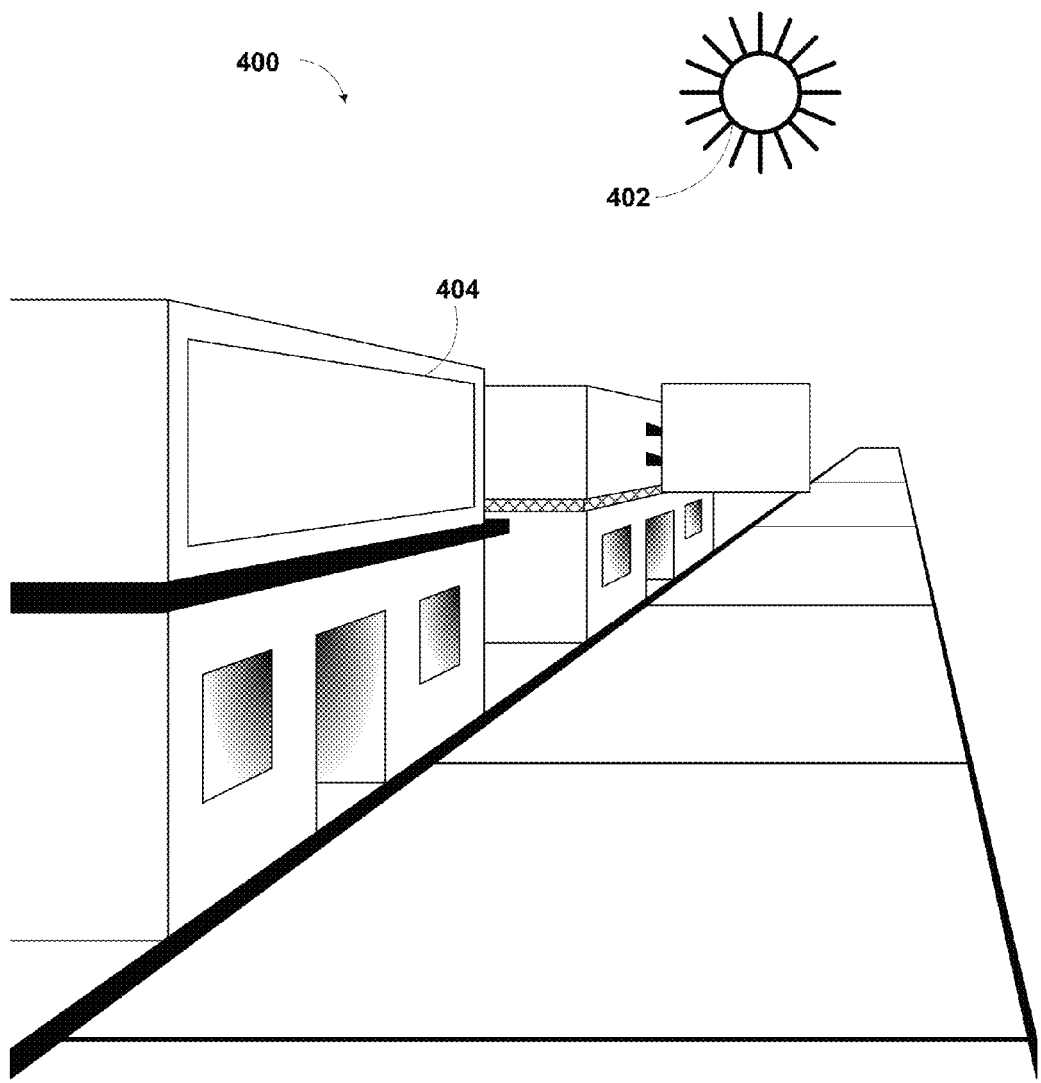
FIG. 4A illustrates a field of view of a device, according to an example embodiment.

FIG. 4A illustrates a field of view 400 of a device (such as a handheld device, a head-mountable device, or other portable/mobile device). In some embodiments, the field of view 400 could represent a view of the real-world environment of the head-mountable device. The head-mountable device could include one or more displays operable to provide graphics while also providing a view of the real-world environment. Thus, the head-mountable device could be configured to provide a view of a graphical representation and a view of the real-world environment from a viewing location, such as an eye of a user of the head-mountable device. Further, although the implementations described herein could utilize one or more see-through displays, other implementations may utilize one or more opaque displays. The head-mountable device could be any of the devices shown and described in reference to FIGS. 1A-3.

The field of view 400 could be a viewable scene as viewed through an optical element. The optical element could be similar or identical to the optical element 331 as described in reference to FIG. 3. The field of view 400 could include a bright light source 402 (e.g., the sun) and an area of interest 404. Depending upon the lighting conditions, the bright light source 402 may cause the area of interest 404 to be difficult to view.

Figure 4B:
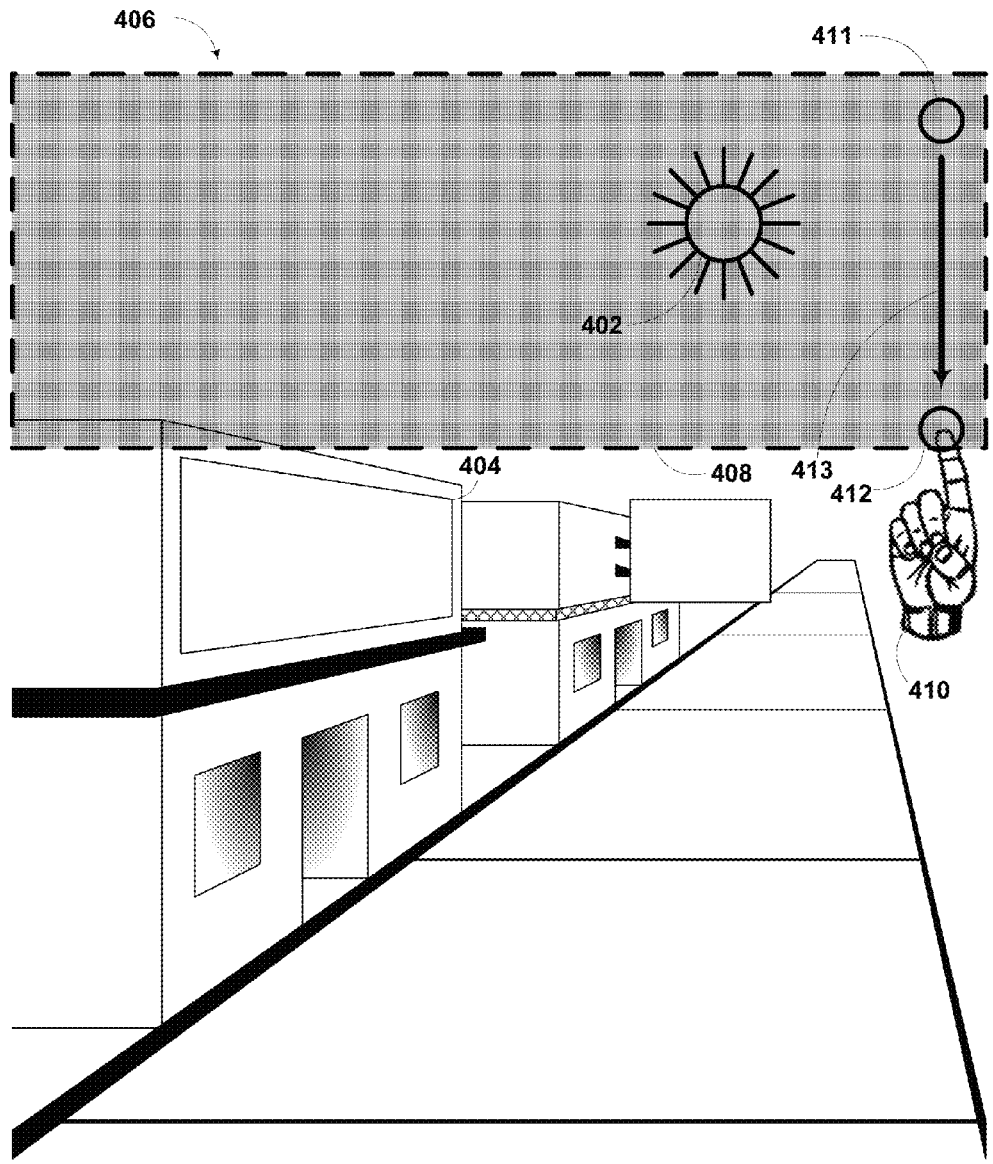
FIG. 4B illustrates a field of view of a device, according to an example embodiment.

FIG. 4B illustrates a field of view 406 of a device (e.g., a head-mountable device) through an optical element. The field of view 406 could include the bright light source 402, the area of interest 404, and a top portion 408 of the optical element. In such a scenario, a user of the head-mountable device could provide a gesture, shown in this example as a swipe interaction 413, by touching a touch-sensitive surface. In some cases, the swipe interaction 413 could include the user using a finger 410 to touch the touch-sensitive surface at an initial contact point 411. The user could then drag the finger 410 to a final contact point 412 on the touch-sensitive surface. In this example in FIG. 4B, the touch-sensitive surface is shown incorporated into the optical element. Thus, within the context of FIG. 4B, the swipe interaction 413 could be performed substantially within the field of view 406 by touching the optical element (through which a user looks).

Other positions of the touch-sensitive surface are possible. In such cases, the swipe interaction 412 need not occur within the field of view 406. In such examples, digital icons (such as a user finger 410 and swipe interaction 413 sliders) can be shown on the optical element to provide references to the user or to indicate that a gesture input is being received. For instance, while a gesture input is received on a side-arm touchpad device, the digital icons can be displayed.

In response to the swipe interaction 413, a controller of the head-mountable device could reduce the transmittance of the top portion 408 of the optical element. Thus, the field of view 406 may become sequentially darker from near the top of the optical element and moving towards the bottom of the optical element. As such, the bright light source 402 could be shaded to make the area of interest 404 easier to view.

Figure 4C:
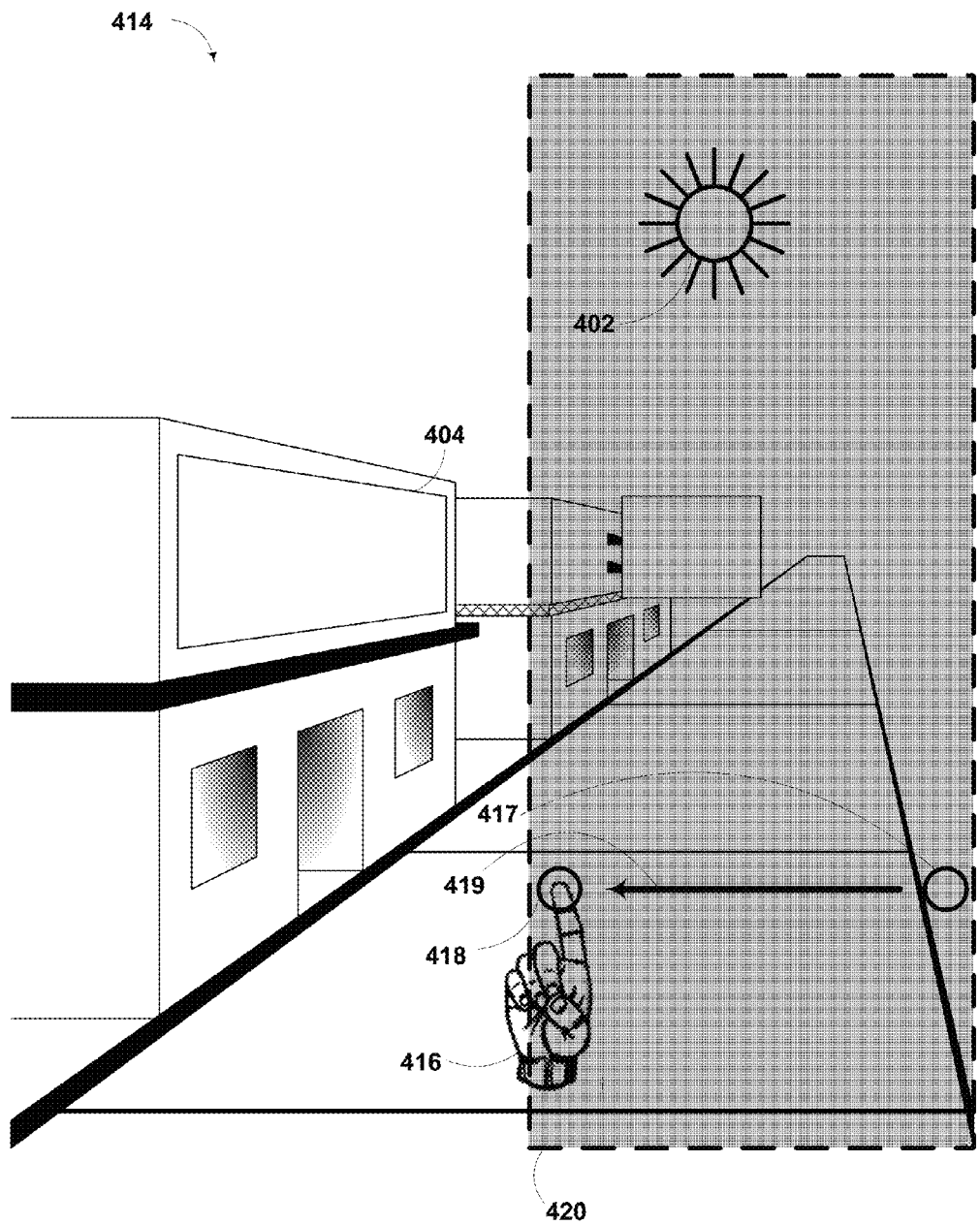
FIG. 4C illustrates a field of view of a device, according to an example embodiment.

FIG. 4C illustrates another field of view 414 of a device (e.g., a head-mountable device) through an optical element. The field of view 414 may include the bright light source 402, the area of interest 404, and a right-side portion 420 of the optical element. In such a scenario, a user of the head-mountable device could touch a touch-sensitive surface at initial contact point 417 and drag a finger 416 to the left to final contact point 418 to perform a swipe interaction 419.

In response to the swipe interaction 419, a controller of the head-mountable device could control the transmittance of the right-side portion 420 of the optical element to decrease. Further, the change in transmittance could progress in the same direction as the swipe interaction. In other words, as the swipe interaction 419 progresses from the right to left, the transmittance of the optical element could be progressively changed at a similar rate and in a similar direction of progression. By shading the right-side portion 420 of the optical element, the area of interest 404 may be easier to view.

Although FIGS. 4B and 4C illustrate an example of using the head-mounted device to shade a bright light source 402 for better visibility of an area of interest 404, other uses of the apparatus and method are possible. For example, a user may have a need to obscure or dim a portion or all of a field of view of the environment of the head-mounted device for any number of reasons. The disclosed apparatus and method could be applied in any such scenarios.

4. Example Methods

Figure 5A:
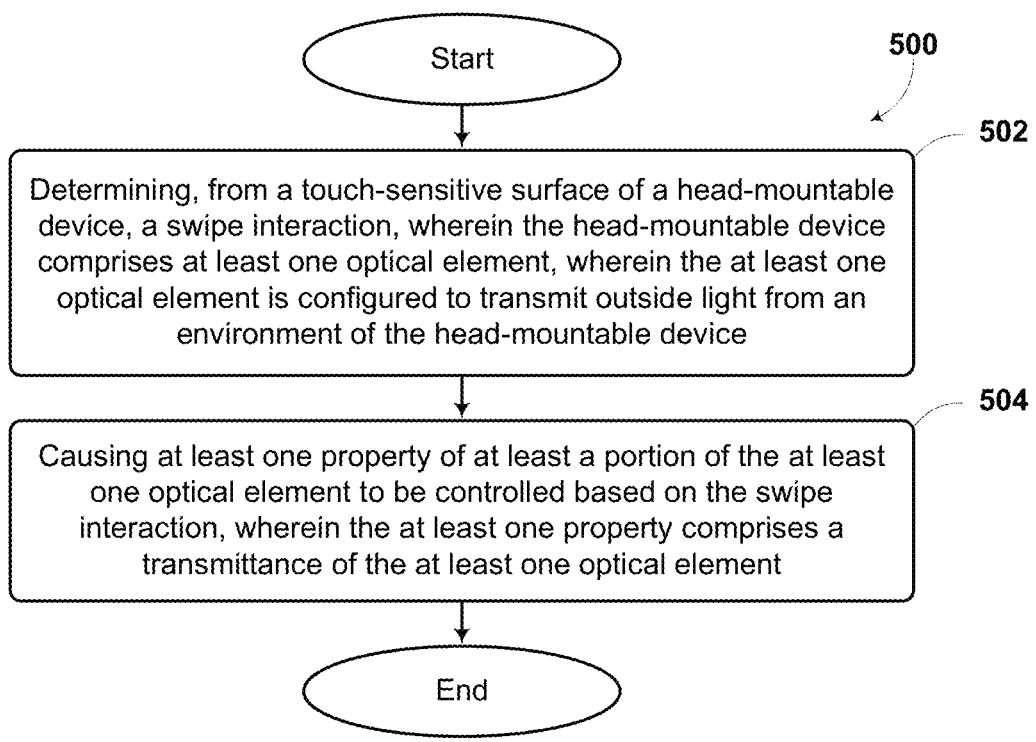
FIG. 5A is a method, according to an example embodiment.

A method 500 is provided for determining, from a touch-sensitive surface of a head-mountable device, a swipe interaction. The head-mountable device includes at least one optical element, which is configured to transmit light from an environment of the head-mountable device. The disclosed apparatus and method further relate to controlling at least one property of at least a portion of the at least one optical element based on the swipe interaction. The at least one property includes a transmittance of the at least one optical element. The method could be performed using any of the apparatus shown in FIGS. 1A-3 and described above, however, other configurations could be used. FIG. 5A illustrates the steps in an example method, however, it is understood that in other embodiments, the steps may appear in different order and steps could be added or subtracted.

Step 502 includes determining, from a touch-sensitive surface of a head-mountable device, a gesture (e.g., swipe interaction). The head-mountable device includes at least one optical element, and the at least one optical element could be configured to transmit outside light from an environment of the head-mountable device. An example embodiment could include the head-mountable device 300 shown and described in reference to FIG. 3. However, other device types are possible.

The touch-sensitive surface could be a touch screen, a capacitive surface, a resistive surface, a surface-acoustic wave surface, or generally a touchpad. Other types of touch-sensitive surfaces are possible.

Although FIG. 5A describes determining a swipe interaction, other input gestures may be determined as well. Examples of such gestures include a tap, a predefined touch movement, a circular touch movement, or a combination of a tap and touch movement or combination of any touch movement.

Step 504 includes controlling (or providing instructions executable to control) at least one property of at least a portion of the at least one optical element based on the swipe interaction. The at least one property includes a transmittance of the at least one optical element. Thus, in response to determining the swipe interaction, at least a portion of the optical element could be controlled to change transmittance. Thus, at least a portion of the outside light from the environment could be prevented from being viewable at a viewing location of the head-mountable device. The viewing location could correspond to, for instance, a position of one or both eyes of a user of the head-mountable device.

The optical element could be any thin film, surface, lens, or other see-through material or substrate that is configured to change at least one property in response to determining the swipe interaction. More specifically, the optical element could represent at least one liquid crystal film/cell and/or an electrochromic film/cell. In some cases, the optical element could include a plurality of operable segments or cells in a row/column or other array or multi-element format (e.g., hexagonal close packed, randomly packed, etc.).

In the examples in which the gesture includes a swipe interaction, the swipe interaction could include a top-to-bottom swipe, a bottom-to-top swipe, a left-to-right swipe, or a right-to-left swipe. Other swipe types and directions are possible. Further, each swipe interaction could be identified by a swipe direction and a swipe length. The transmittance of the optical element could be controlled based upon the swipe direction and the swipe length. For instance, if a user of the head-mountable device swipes from the top of the touch-sensitive surface towards the bottom of the touch-sensitive surface, the optical element may be controlled to reduce its transmittance progressively from top to bottom.

Figure 5B:
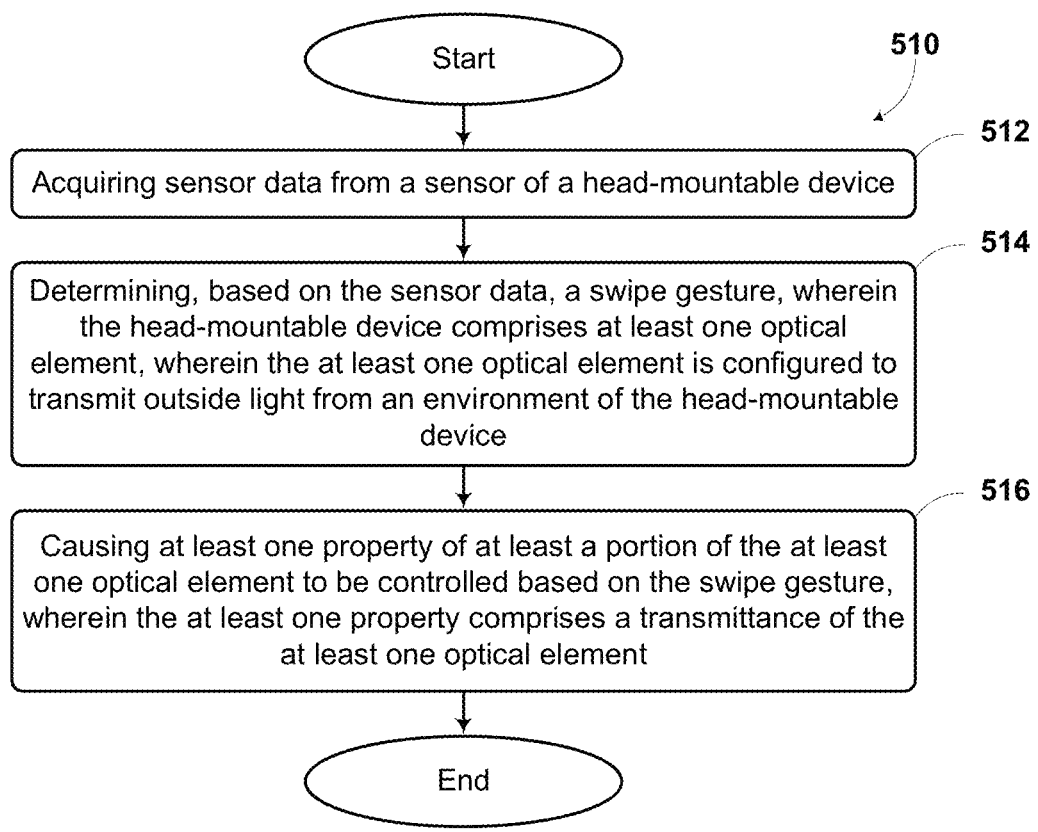
FIG. 5B is a method, according to an example embodiment.

In another embodiment, a method 510 is provided. The method 510 may describe acquiring sensor data from a sensor of a head-mountable device, determining a swipe gesture based on the sensor data, and causing at least one property of at least a portion of at least one optical element to be controlled based on the swipe gesture. The at least one property includes a transmittance of the at least one optical element. The method could be performed using any of the apparatus shown in FIGS. 1A-3 and described above, however, other configurations could be used. FIG. 5B illustrates the steps in an example method, however, it is understood that in other embodiments, the steps may appear in different order and steps could be added or subtracted.

Step 512 includes acquiring sensor data from a sensor of a head-mountable device. The sensor of the head-mountable device could include one or more cameras, one or more photodiodes, and/or a series of photodiodes and light-emitting diodes. In some embodiments, the sensor could be part of an eye-tracking system, such as the eye-tracking system 302 as described in reference to FIG. 3.

The head-mountable device could be the head-mountable device 300 described in reference to FIG. 3. The head-mountable device could include at least one optical element, which may be configured to transmit outside light from an environment of the head-mountable device. For example, the at least one optical element could include a see-through display. As such, a user of the head-mountable device could be able to see the outside light through the see-through display. Other configurations of the at least one optical element are possible.

Step 514 includes determining, based on the sensor data, a gesture. In some embodiments, the gesture may be a swipe gesture and could be determined by a computer system of the head-mountable device. In other embodiments, the swipe gesture could be determined in part or in full by another computer system (e.g., a server network).

The gesture could include a physical gesture by a user of the head-mountable device. For example, the user of the head-mountable device could move a hand from left to right. Such a motion could be sensed by a forward-facing camera of the head-mountable device. The sensor data from the forward-facing camera could be used to determine the swipe gesture from a set of predetermined swipe gestures. For instance, the set of predetermined swipe gestures could include a left-to-right swipe, a right-to-left swipe, a top-to-bottom swipe, and a bottom-to-top swipe. Other predetermined swipe gestures are possible. In the example embodiment, a left-to-right swipe gesture could be determined from the sensor data that indicates the user's hand is moving from left to right. Other hand movements could be correlated to the other predetermined swipe gestures.

Other physical gestures could be determined to be swipe gestures. For example, a user of the head-mountable device could hold up a combination of fingers or form one or more hand signs (e.g., using sign language or make a fist). Such hand signs could correspond to predetermined swipe gestures and could be determined to be various swipe gestures.

In another embodiment, eye-fixation gestures could be determined to be swipe gestures. For example, the eye-tracking system could acquire sensor data that could relate to a gaze axis of at least one eye of a user of the head-mountable device. Based on the sensor data, the eye-fixation gesture could be determined. For example, a user could fixate their gaze upon a graphical icon in the user interface of the head-mountable device. Eye-fixation could be determined if, for instance, a user of the head-mountable device gazes for longer than 500 milliseconds along a particular gaze axis. Upon determining eye-fixation, the eye-fixation gesture could relate to the user moving the gaze axis up, down, left, or right. Other eye-fixation gestures could be determined to be swipe gestures based on the sensor data.

After determining the gesture, the head-mountable device may be configured to display icons depicting a conceptual display of the gesture to the user, for example.

Step 516 includes causing at least one property of at least a portion of the at least one optical element to be controlled based on the swipe gesture. In particular, the at least one property could include a transmittance of the at least one optical element. For example, a user of the head-mountable device could perform a physical gesture (e.g., wave a hand from left to right). A forward-facing camera could acquire sensor data corresponding to the physical gesture. Based on the sensor data, a left-to-right swipe gesture could be determined. Upon determining the left-to-right swipe gesture, the at least one optical element could be controlled to decrease transmittance of outside light in a portion starting from a left side of the optical element and moving to the right. In particular, the at least one optical element could be controlled to appear as though a translucent or opaque 'shade' was being pulled from left to right. Other ways of controlling the transmission of outside light through at least a portion of at least one optical element using physical gestures are possible.

In another embodiment, an eye-fixation gesture could be performed by a user of the head-mountable device. In such a case, a user could fixate upon a graphical icon and then move a gaze axis from left to right. Similar to the previous example, the at least one optical element could be controlled to decrease transmittance of outside light starting from a left side of the optical element and moving to the right. In other words, a user may be able to pull an opaque or translucent 'shade' into (and out of) a field of view using eye-fixation gestures. Other ways to control the transmittance of at least a portion of at least one optical element using eye-fixation gestures are possible.

Example methods, such as method 500 of FIG. 5A and method 510 of FIG. 5B, may be carried out in whole or in part by the device and its subsystems. Accordingly, example methods could be described by way of example herein as being implemented by the device. However, it should be understood that an example method may be implemented in whole or in part by other computing devices. For example, an example method may be implemented in whole or in part by a server system, which receives data from the device. Other examples of computing devices or combinations of computing devices that can implement an example method are possible.

It should be understood that there are other similar methods that could describe determining a swipe interaction using a touch-sensitive surface of a head-mountable device and then controlling at least a transmittance of at least a portion of an optical element of the head-mountable device based on the swipe interaction. Additionally, there may be other similar methods related to acquiring sensor data from a sensor of a head-mountable device, determining a swipe gesture based on the sensor data, and controlling at least a transmittance of at least a portion of an optical element of the head-mountable device based on the swipe gesture. Those similar methods are implicitly contemplated herein.

Figure 6:
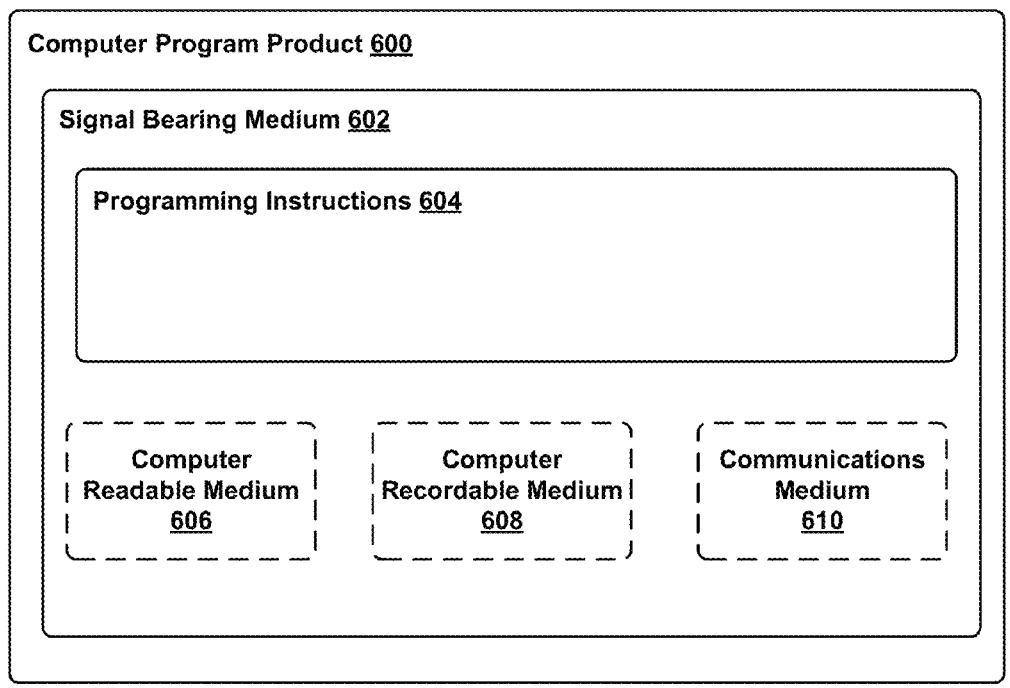
FIG. 6 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the controller 312 of FIG. 3 may be configured to provide various operations, functions, or actions in response to the programming instructions 604 conveyed to the controller 312 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a device, such as the head-mountable device 300 shown and described in reference to FIG. 3. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
    determining, from a touch-sensitive surface of a head-mountable device, a gesture comprising an initial point and a final point, wherein the head-mountable device comprises an eyepiece, wherein the eyepiece is configured to transmit outside light from a field of view of the head-mountable device, wherein the touch-sensitive surface comprises a touch pad, wherein the eyepiece comprises a plurality of operable segments, wherein the plurality of operable segments comprises at least one row and at least one column, wherein the plurality of operable segments is arranged along a surface of the eyepiece such that at least a portion of the outside light is transmitted through the plurality of operable segments;
    determining a portion of the plurality of operable segments based on the initial point and the final point; and
    causing at least one property of the portion of the plurality of operable segments to be controlled based on the gesture, wherein the at least one property comprises a transmittance of the portion of the plurality of operable segments.

2. The method of claim 1, wherein the touch-sensitive surface comprises at least one of a touch screen, a capacitive surface, a resistive surface, and a surface-acoustic wave surface.

3. The method of claim 1, wherein the eyepiece comprises at least one of an electrochromic film and a liquid crystal film.

4. The method of claim 1, wherein the gesture comprises at least one of a top-to-bottom swipe, a bottom-to-top swipe, a left-to-right swipe, and a right-to-left swipe.

5. The method of claim 1, wherein the gesture comprises information indicative of a swipe direction and a swipe length.

6. The method of claim 5, wherein causing at least one property of the portion of the plurality of operable segments to be controlled based on the gesture comprises causing the at least one property of the portion of the plurality of operable segments to be controlled based on the swipe direction and the swipe length.

7. The method of claim 5, wherein causing the at least one property of the portion of the plurality of operable segments to be controlled based on the gesture comprises causing the at least one property of the portion of the plurality of operable segments to be sequentially controlled while the gesture proceeds in the swipe direction.

8. The method of claim 1, wherein causing the at least one property of the portion of the plurality of operable segments comprises causing the at least one property to be controlled so as to prevent at least a portion of the outside light from being viewable at a viewing location of the head-mountable device.

9. A head-mountable device, comprising:
    a touch-sensitive surface configured to receive a gesture input comprising an initial point and a final point, wherein the touch-sensitive surface comprises a touch pad;
    an eyepiece configured to transmit outside light from a field of view of the head-mountable device, wherein the eyepiece comprises a plurality of operable segments, wherein the plurality of operable segments comprises at least one row and at least one column, wherein the plurality of operable segments is arranged along a surface of the eyepiece such that at least a portion of the outside light is transmitted through the plurality of operable segments; and a controller configured to:

determine a portion of the plurality of operable segments based on the initial point and the final point; and adjust at least one property of the portion of the plurality of operable segments based on the gesture input, wherein the at least one property comprises a transmittance of the portion of the plurality of operable segments.

10. The head-mountable device of claim 9, wherein the touch-sensitive surface comprises at least one of a touch screen, a capacitive surface, a resistive surface, and a surface-acoustic wave surface.

11. The head-mountable device of claim 9, wherein the eyepiece comprises at least one of an electrochromic film and a liquid crystal film.

12. The head-mountable device of claim 9, wherein the gesture input comprises at least one of a top-to-bottom swipe, a bottom-to-top swipe, a left-to-right swipe, and a right-to-left swipe.

13. The head-mountable device of claim 9, wherein the gesture input comprises information indicative of a swipe direction and a swipe length.

14. The head-mountable device of claim 13, wherein the controller is further configured to adjust the at least one property of the portion of the plurality of operable segments based on the swipe direction and the swipe length.

15. The head-mountable device of claim 13, wherein the controller is further configured to sequentially adjust the at least one property of the portion of the plurality of operable segments while the gesture input proceeds in the swipe direction.

16. The head-mountable device of claim 9, wherein the controller is further configured to adjust the transmittance of the portion of the plurality of operable segments so as to prevent at least a portion of the outside light from being viewable at a viewing location of the head-mountable device.

17. The head-mountable device of claim 9, wherein the head-mountable device is configured to provide a view, from a viewing location, of:

a graphical representation; and a real-world environment of the device.

18. A non-transitory computer readable medium having stored therein instructions executable by a computer system to cause the computer system to perform functions comprising:

causing a head-mountable device to receive, from a touch-sensitive surface of the head-mountable device, a gesture input comprising an initial point and a final point, wherein the head-mountable device comprises an eyepiece, wherein the eyepiece is configured to transmit outside light from a field of view of the head-mountable device, wherein the eyepiece comprises a plurality of operable segments, wherein the plurality of operable segments comprises at least one row and at least one column, wherein the plurality of operable segments is arranged along a surface of the eyepiece such that at least a portion of the outside light is transmitted through the plurality of operable segments, wherein the touch-sensitive surface comprises a touch pad;

determining a portion of the plurality of operable segments based on the initial point and the final point; and causing at least one property of the portion of the plurality of operable segments to be controlled based on the gesture input, wherein the at least one property comprises a transmittance of the portion of the plurality of operable segments.

19. A method, comprising:

acquiring sensor data from a sensor of a head-mountable device;

determining, based on the sensor data, a gesture input comprising an initial point and a final point, wherein the head-mountable device comprises an eyepiece, wherein the eyepiece is configured to transmit outside light from an environment of the head-mountable device, wherein the eyepiece comprises a plurality of operable segments, wherein the plurality of operable segments comprise at least one row and at least one column, wherein the plurality of operable segments is arranged along a surface of the eyepiece such that at least a portion of the outside light is transmitted through the plurality of operable segments;

determining a portion of the plurality of operable segments based on the initial point and the final point; and causing at least one property of the portion of the plurality of operable segments to be controlled based on the gesture input, wherein the at least one property comprises a transmittance of the portion of the plurality of operable segments.

20. The method of claim 19, wherein the sensor of the head-mountable device comprises at least one of a camera, a photodiode, and a series of photodiodes and light-emitting diodes.

21. The method of claim 19, wherein determining the gesture input comprises using an eye-tracking system of the head-mountable device to determine an eye-fixation gesture.

22. The method of claim 19, wherein the eyepiece comprises at least one of an electrochromic film and a liquid crystal film.

23. The method of claim 19, wherein the gesture input comprises at least one of a top-to-bottom swipe, a bottom-to-top swipe, a left-to-right swipe, and a right-to-left swipe.

24. The method of claim 19, wherein the gesture input comprises information indicative of a swipe direction and a swipe length.

25. The method of claim 24, wherein causing the at least one property of the portion of the plurality of operable segments to be controlled based on the gesture input comprises causing the at least one property of the portion of the plurality of operable segments to be controlled based on the swipe direction and the swipe length.

26. The method of claim 24, wherein causing the at least one property of the portion of the plurality of operable segments to be controlled based on the gesture input comprises causing the at least one property of the portion of the plurality of operable segments to be sequentially controlled while the gesture input proceeds in the swipe direction.

27. The method of claim 19, wherein causing the at least one property of the portion of the plurality of operable segments comprises causing the at least one property to be controlled so as to prevent at least a portion of the outside light from being viewable at a viewing location of the head-mountable device.

* * * * *